July 14, 1931. W. H. HIMES 1,813,997
WORM GEAR REDUCTION MECHANISM
Filed Aug. 22, 1928   2 Sheets-Sheet 1

INVENTOR
Walter H. Himes
BY
ATTORNEY

July 14, 1931.    W. H. HIMES    1,813,997

WORM-GEAR REDUCTION MECHANISM

Filed Aug. 22, 1928    2 Sheets-Sheet 2

INVENTOR
Walter H. Himes.
BY
ATTORNEY

Patented July 14, 1931

1,813,997

UNITED STATES PATENT OFFICE

WALTER H. HIMES, OF WILKINSBURG, PENNSYLVANIA, ASSIGNOR TO WESTINGHOUSE ELECTRIC & MANUFACTURING COMPANY, A CORPORATION OF PENNSYLVANIA

WORM-GEAR REDUCTION MECHANISMS

Application filed August 22, 1928. Serial No. 301,241.

My invention relates, in general, to transmission mechanisms, and particularly to worm-gear drive mechanisms.

An object of my invention is, generally speaking, to provide an efficient and durable worm-gear drive mechanisms.

A further object of my invention is to provide mounting means for a worm drive mechanism that is designed to support the worm in such manner that the process of adjusting the worm gearing is greatly simplified.

In the prior art it has been considered desirable to utilize worm gearing of the Hindley type in which the worm is constructed to conform to the curvature of the periphery of the worm wheel. Such gearing has been found to be more efficient and durable than the gearing utilizing a standard cylindrical worm for the reason that the area of contact between the worm and the worm wheel of the Hindley or hourglass type is much greater. However, it has been found to be very difficult to properly position a worm of the hourglass-shape relative to the worm wheel, and, therefore, worm drive mechanisms utilizing the standard cylindrical worms, although less efficient and less durable, are ordinarily used.

In order that a worm drive mechanism of the Hindley type may operate properly, it is necessary that the worm be precisely adjusted in three planes. That is, the distance between the axis of the worm and the axis of the worm wheel must be properly adjusted, the worm axis must be positioned in a plane at right angles to the axis, and in the mid plane, of the worm wheel, and the worm must be so positioned along its own axis that the curvature of its outer surface will conform to the curvature of the worm wheel. Because of this latter requirement, it is very difficult to maintain proper adjustment in the thrust bearings for supporting the worm. In the standard cylindrical-worm type of worm gearing, the position of the worm along its own axis relative to the worm wheel is not important, and, therefore, the thrust bearings may be adjusted by simply moving the worm the required distance along its own axis.

In the standard type of worm drive, therefore, it is simply necessary to so adjust the worm that its axis will lie in the central plane of the worm wheel at right angles to the axis thereof and at the proper normal distance from the axis of the worm wheel. It is apparent that the simplicity of adjustment of the standard worm-wheel mechanism as compared with the Hindley worm drive is of such advantage that, for ordinary applications, it is preferable to utilize the standard cylindrical worm.

In the present invention, I have provided means for so mounting a worm of the Hindley type that the process of adjusting the worm relative to the worm wheel is reduced to simply the one operation of properly selecting the distance between the axis of the worm wheel and the axis of the worm. The mechanism by which this result may be accomplished will be readily understood upon studying the following description in connection with the accompanying drawings in which.

Figure 1:
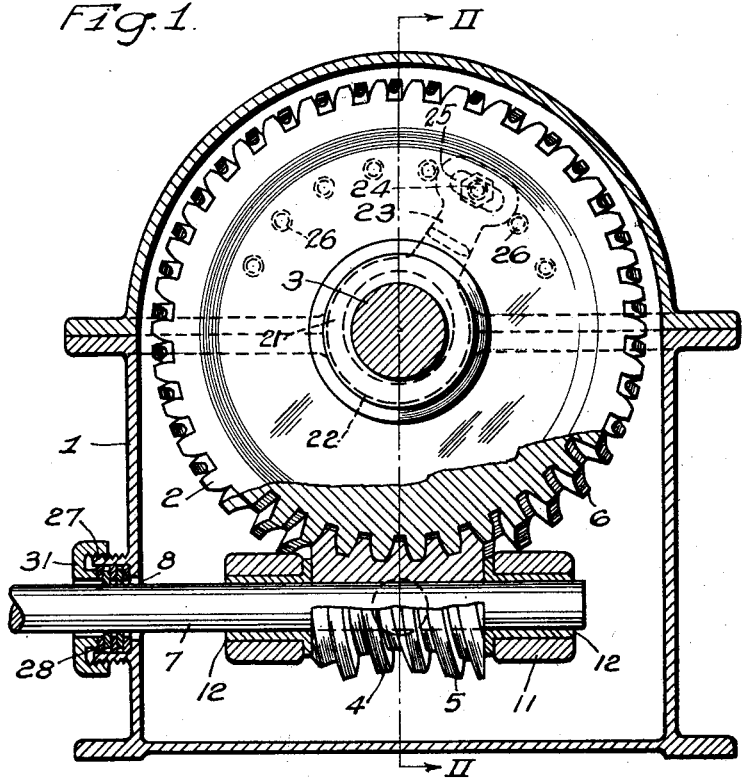
Fig. 1 is a view, partially in section and partially of an end elevation, of the transmission mechanism embodying the principles of my invention.
Figure 2:
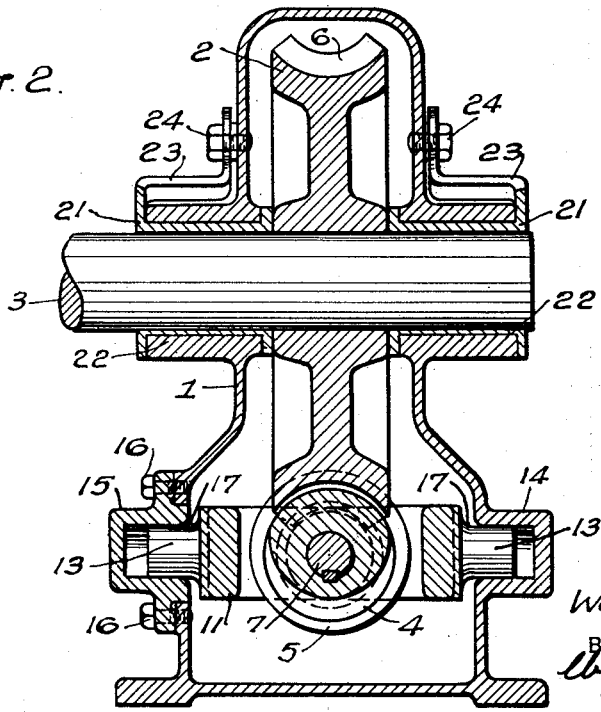
Fig. 2 is a view, in cross-section, of the transmission mechanism taken along the line II—II of Fig. 1.

Referring to the drawings, the worm-gear reduction unit shown in Figs. 1 and 2 comprises a casing 1 for enclosing and supporting a worm wheel 2 that is carried by a shaft 3 which is journalled for rotation in opposite sides of the casing 1. For driving the worm wheel, a worm 4 of the Hindley or hourglass type is provided with external threads 5 which are so shaped that they are disposed to engage teeth 6 on the periphery of the worm wheel 1 throughout a considerable arc of the outer surface of the wheel 2. The worm 4 is mounted on a shaft 7 that is disposed with its axis in a plane at right angles to the axis of the worm wheel 3 and projects through an opening 8 in the casing 1.

Figure 3:
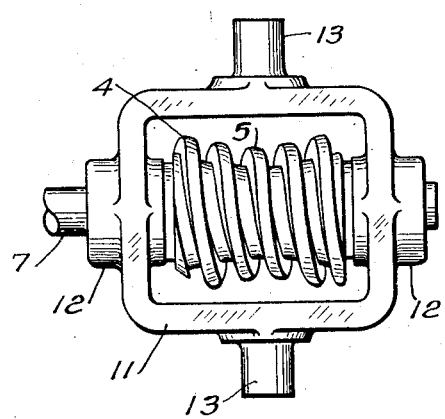
Fig. 3 is a plan view of the hourglass worm and a cradle for supporting the worm, as shown in Figs. 1 and 2.

To provide a mounting for the worm 4 which is disposed to permit the worm 4 to be readily adjusted to the worm wheel 2, the worm is journalled within a cradle or supporting bracket 11. As shown in Fig. 3, the cradle is disposed to completely encircle the worm 4 and is provided, at its ends, with thrust and radial bearings 12 that serve to rotatably support the shaft 7 and to constrain the worm 4 from axial movement relative to the cradle 11.

For the purpose of mounting the cradle 11 within the casing 1, it is provided with trunnions 13 having their axes in alignment and at right angles to the axis of the shaft 7.

As shown in Fig. 2, the trunnions 13 are supported in the opposite sides of the casing 1 by means of the bearings 14 and 15 in such manner that their axes are substantially parallel to the axis of the shaft 3, and the axis of the shaft 7 is disposed in substantially the mid transverse plane of the worm wheel 2. In order to facilitate assembling the cradle 11 in its operating position, the bearing 15 in the casing 1 is constructed in such manner that it may be removed by simply removing cap screws 16 which normally hold it in position on the side of the casing 1. It may be readily seen that, when so mounted, the worm 4 will tend to turn or rock about the axes of the trunnions 13 until it has assumed a position in which all of the threads 5 engage the teeth 6 on the worm wheel 2.

To provide for adjustment of the worm 4 axially with respect to the worm wheel 2, clearance spaces 17 are provided between the outer sides of the cradle 11 and the inside of the housing 1 in such manner that the worm 4 and the cradle 11 are free to move or float into its normal operating relation to the worm wheel 2.

It may be readily seen that, by means of this floating mounting, the worm 4 is adapted to adjust itself to the worm wheel 2 relative to its own axis by rocking on the centers of the trunnions 13 and relative to the axis of the gear wheel 2 by sliding longitudinally of the trunnions 13. The only remaining direction in which it is desirable to adjust the worm 4 relative to the worm wheel 2 is, then, in a radial direction for the purpose of regulating the distance between the axis of the shaft 3 and that of the shaft 7 to adjust the clearances between the threads 5 of the worm 4 and the teeth 6 of the worm wheel 2. This radial adjustment of the worm wheel 2 may be readily accomplished by mounting the shaft 3 in eccentric bearings 21 that are disposed to rotate within openings 22 in the sides of the casing 1.

As shown, each bearing 21 is provided with an arm 23 by means of which it may be turned in order that the shaft 3 may be moved towards or away from the shaft 7 in accordance with the position of the center of the eccentric bearing shell 21 relative to the center of the opening 22 in the casing 1.

In order to properly adjust a worm-gear transmission mechanism that is provided with supporting means for the worm that embodies my invention, it is simply necessary to turn the arms 23 until the proper fit or clearance condition is obtained between the worm wheel 2 and the worm 4.

As explained heretofore, the worm 4 will seat itself properly upon the periphery of the worm wheel 2 without further attention. When the proper adjustment has been secured, the arms 23 may be fastened in their final positions relative to the casing 1 by means of bolts 24 which extend through slots 25 in the ends of the arms 23 and through holes 26 in the sides of the casing 1.

In order that the casing 1 may be entirely closed for the purpose of retaining lubricant, a special packing gland 27 is provided for closing the opening 8 through which the shaft 7 projects from the casing 1.

It may be readily seen that, while the reduction unit is being adjusted, it is necessary that the shaft 7 be permitted to move slightly in order that the worm 4 may assume the proper position relative to the worm wheel 2. To accommodate this movement of the shaft 7, the packing gland 27 is made up of a plurality of plates or washers 28, preferably of antifriction metal. One-half of these washers are made large enough to engage the inner surface of the gland 27 and to permit movement of the shaft 7 within their central openings. The remainder of the washers which are disposed alternately with the washers of large diameter, are made just sufficiently large to snugly engage the shaft 7 and to be freely movable within the packing gland 27. Suitable fibrous or other packing material may be interposed between the washers, if such is found to be desirable. After the worm 4 has been properly adjusted relative to the worm wheel 2, the packing nut 31 on the packing gland 27 may be tightened in order that the washers may be secured in their final operating position and in proper alignment with the axis of the worm 4.

As shown in Figs. 1, 2 and 3, the axis of trunnions 13 is disposed at right angles to the axis of the worm 4 and in its mid transverse plane for purposes of illustration. However, in practice, it may be found desirable to place the axis of the trunnions 13 in some other position relative to the axis of the worm 4 in order that the reactive forces exerted by the worm wheel 2 upon the worm 4 may be properly balanced to force the worm 4 into accurate engagement with the wheel 2 at all times.

Figure 4:
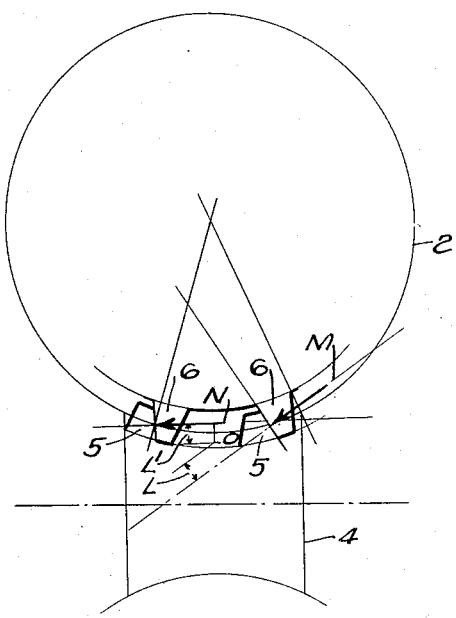
Fig. 4 is a diagrammatic representation of a worm and worm-wheel mechanism showing some of the forces acting between the members and a method for selecting the most advantageous position for the trunnion axis of the worm cradle.

As shown in Fig. 4, the forces imposed upon the end threads 5 of the worm 4 by the teeth 6 of the worm wheel 2 may be represented by the force vectors M and N which may be assumed to represent, for the purpose of this illustration, all of the force exerted upon the worm 4 by the worm wheel 2. If the position of the axis of the trunnions 13 is selected at O, it may be readily seen that the moments exerted by the forces M and N about the axis O are respectively ML and NL'. Inasmuch as the position of the axis O is so chosen that the moment arm L is equal to the moment arm L', the moments exerted by the forces M and N about the axis O will be equal and opposite.

When the worm 4 is in its normal operating position relative to the worm wheel 2, it may be readily seen that, if the worm 4 becomes displaced axially relative to the worm wheel 2, the forces M and N will be unequal, and the resulting unbalanced moment about the axis O will tend to move the worm 4 into such position that the forces M and N will balance each other.

From the foregoing description and explanation, it may be readily seen that, by means of my invention, it is possible to construct and operate a worm-gear reduction mechanism of the Hindley type that is efficient in operation and that may be easily and accurately adjusted.

Although I have described a specific embodiment of my invention, it will be obvious to those skilled in the art that various modifications may be made in the manner of supporting the hourglass worm or any other details of the construction of a worm gear mechanism embodying the principles set forth without departing from the spirit and scope of the invention, as defined in the appended claims.

I claim as my invention:

1. A transmission mechanism comprising a worm gear wheel, a worm disposed to mesh with the gear wheel, a bracket for supporting the worm, said bracket being mounted in such manner that it is free to move axially with respect to the gear-wheel and to turn in a plane at right angles to the axis of the gear wheel.

2. A worm-gear mechanism of the Hindley type comprising a worm wheel, means for rotatably supporting the worm wheel, a worm of hourglass shape for engaging the worm wheel, supporting means for the worm adapted to permit turning of the worm about an axis parallel to the axis of the worm wheel and to permit lateral movement of the worm along the turning axis, and means for adjusting the positions of the worm wheel in a plane perpendicular to its axis.

3. A worm drive comprising, in combination, a worm gear wheel, a worm meshing with the gear wheel, and a bracket provided with trunnions which extend parallel to the axis of the gear wheel, said worm being carried by the bracket, said trunnions being disposed to move longitudinally to permit the worm to adjust itself to the worm wheel.

In testimony whereof, I have hereunto subscribed my name this 13th day of August 1928.

WALTER H. HIMES